United States Patent [19]
Nathan et al.

[11] Patent Number: 5,870,212
[45] Date of Patent: Feb. 9, 1999

[54] SELF-HEALING OPTICAL NETWORK

[75] Inventors: Sridhar Nathan; John A. Fee, both of Plano, Tex.

[73] Assignee: MCIWorldCom, Inc., Ga.

[21] Appl. No.: 6,965

[22] Filed: Jan. 14, 1998

[51] Int. Cl.⁶ .............................. H04J 14/00; H04B 10/20
[52] U.S. Cl. ........................ 359/119; 359/110; 359/128; 359/139
[58] Field of Search ..................................... 359/110, 117, 359/119, 124, 128, 139; 370/217, 222–223, 227

[56] References Cited

PUBLICATIONS

Yamashita et al., "Flexable Synchronous Broad–Band Subscriber Loop System : Optical Shuttle Bus", Journal of Lightwave Technology. vol. 7, No. 11, pp. 1788–1797, Nov. 1989.
Uehara et al., "Highly Reliable and Economical WDM Ring with Optical Self–Healing and 1:N Wavelength Protection", ECOC 97, 22–25 Sep. 1997, Conference Publication No. 448.

Takeshita et al., "A Demonstration of an Optical Cross–Connect System for a Self–Healing Optical Network", ECOC 97, 22–25 Sep. 1997, Conference Publication No. 448.

*Primary Examiner*—Kinfe-Michael Negash

[57] ABSTRACT

A self-healing optical network carrying traffic between first and second optical linear terminals. The self-healing optical network including first, second, and third optical switching units, first, second, and third spare optical channels, and a working optical channel. The first, second, and third optical switching units are coupled in a ring configuration using said first, second, and third spare optical channels. The first and second optical switching units are coupled by the first spare optical channel and by the working optical channel. The first and second optical switching units each direct the traffic between the first and second optical linear terminals along the working optical channel or along the second and third spare optical channels in the event the working optical channel is not available.

32 Claims, 10 Drawing Sheets

| Event | Action |
|---|---|
| Failure in Working Path 236 | (1) decouple 2, 3<br>(2) decouple 4, 5<br>(3) couple 2, 5 |
| Failure in Working Path 238 | (1) decouple 1, 6<br>(2) decouple 4, 5<br>(3) couple 1, 4 |

FIG. 4A

| Event | Action |
|---|---|
| Failure in Working Path 238 | (1) decouple 1, 6<br>(2) decouple 2, 3<br>(3) couple 6, 3 |
| Failure in Working Path 242 | (1) decouple 4, 5<br>(2) decouple 2, 3<br>(3) couple 5, 2 |

SELF-HEALING OPTICAL NETWORK

CROSS-REFERENCE TO RELATED APPLICATIONS

This patent application is related to the following commonly owned, co-pending U.S. utility patent applications:

1. "System and Method for Sharing a Spare Channel Among Two or More Optical Ring Networks," Ser. No. 09/006,962, Attorney Docket No. RIC-97-076 (1575.2640000), by Sri Nathan and John Fee, filed concurrently herewith and incorporated herein by reference; and 2. "System and Method for Increasing the Robustness of an Optical Ring Network," Ser. No. 09/006,969, Attorney Docket No. RIC-97-131 (1575.2950000), by Sri Nathan, filed concurrently herewith and incorporated herein by reference.

BACKGROUND OF THE INVENTION

1. Field of the Invention

The present invention relates generally to fiber optic networks.

2. Related Art

Figure 1:
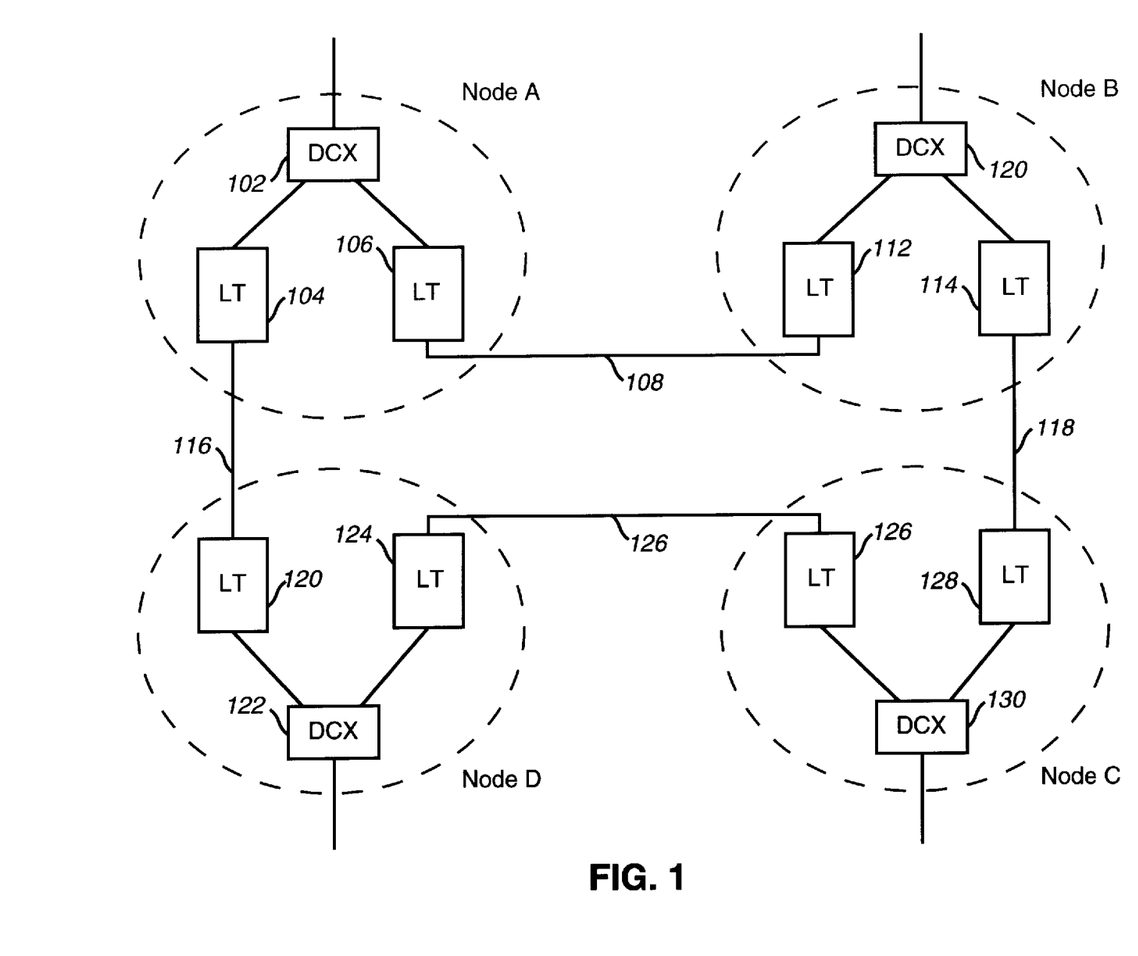
FIG. 1 illustrates a portion of a telecommunications network.

Today's telecommunication networks employ optical channels to carry traffic between nodes. FIG. 1 is a diagram of a portion of a telecommunication network. FIG. 1 shows optical channel 108 connecting node A with node B, optical channel 116 connecting node A with node D, optical channel 118 connecting node B with node C, and optical channel 126 connecting node C with node D.

Each end of an optical channel is terminated by an opto-electronic line terminating equipment (LTE) or an optical linear terminal (LT) (e.g., an Optical Channel-48 point-to-point line terminating equipment) for converting and multiplexing electrical signals into an optical signal for transmission over an optical channel and for converting a received optical signal into electrical signals for transport over the non-optical portions of the telecommunications network.

For example, linear terminal 106 is connected to one end of optical channel 108 and linear terminal 112 is connected to the other end of optical channel 108. Linear terminal 106 receives electrical signals from electrical digital cross-connect switch (DXC) 102 and transforms those signals into optical signals for transmission over optical channel 108. Linear terminal 112 receives optical signals from optical channel 108 and transforms those optical signals back to the electrical domain.

When there is a break in an optical channel, the linear terminals connected to the optical channel detect the channel failure by sensing a loss of signal condition, for example. Upon detecting a channel failure, the linear terminals send a failure indication to a network management system (not shown). The network management system then directs DXCs 102, 110, 122, and 130 to re-route traffic to restore the network.

A problem with using electrical digital cross-connect switches to re-route traffic when the network experiences an optical channel failure is the substantial amount of time it takes to perform the network restoration.

One solution is to replace the linear terminals with add-drop multiplexers (ADMs) and create a conventional optical ring network, such as a bidirectional line switched ring (BLSR). This approach reduces the amount of time it takes to perform network restoration to the 100 millisecond range (approximately). However, this approach is expensive because ADMs must be purchased to replace the linear terminals.

A network design is needed that can quickly recover from an optical channel failure without requiring replacement of the linear terminals.

SUMMARY OF THE INVENTION

The present invention provides a self-healing optical network having linear terminals optically coupled to optical switching units (OSUs), where the optical switching units are connected in a ring configuration. Network restoration occurs entirely in the optical domain, thereby significantly reducing the restoration time.

The self-healing optical network according to a first embodiment of the present invention carries traffic between first and second optical linear terminals. The network includes a plurality of optical switching units, including first, second, and third optical switching units, and a plurality of spare optical channels, and a working optical channel. The plurality of optical switching units are optically coupled in a ring configuration using the plurality of spare optical channels, such that a spare optical channel is provided between each pair of adjacent optical switching units in the ring configuration. The first optical linear terminal is optically coupled to the second optical linear terminal through a first pair of adjacent optical switching units and the working optical channel or, in the event said working optical channel is not available, through the plurality of optical switching units and the plurality of spare optical channels except the spare optical channel provided between the first pair of adjacent optical switching units. By optically coupling the first optical linear terminal to the second optical linear terminal, optical signals can be transmitted from the first optical linear terminal to the second optical linear terminal.

The optical switching units can be switched to form a spare ring path using the spare optical channels. The first linear terminal, upon sensing a failure within a working path that connects the first linear terminal to the second linear terminal, sends a data message indicating an optical channel failure to an adjacent OSU. Similarly, the second linear terminal sends a data message indicating an optical channel failure to an adjacent OSU. Upon receiving a failure indication, the OSU adjacent to the first linear element switches traffic from the first linear terminal onto the spare ring path. The OSU adjacent to the second linear terminal also switches traffic from the spare ring path to the second linear terminal. In this way, the spare ring path is used as an alternate path for caring traffic between the first and second linear terminals.

Another embodiment of the invention includes first and second optical networks. A first optical switching unit is optically coupled to the first and second optical networks. A second optical switching unit is also optically coupled to the first and second optical networks. A spare optical channel is optically coupled between the first and second optical switching units. The first optical switching unit optically couples either the first or second optical network to the spare optical channel depending on which optical network has experienced a failure. Similarly, the second optical switching unit optically couples either the first or second optical network to the spare optical channel depending on which optical network has experienced a failure. In this manner, the spare optical channel is shared by the first and second optical network.

Further features and advantages of the present invention, as well as the structure and operation of various embodiments of the present invention, are described in detail below with reference to the accompanying drawings.

BRIEF DESCRIPTION OF THE FIGURES

The accompanying drawings, which are incorporated herein and form part of the specification, illustrate the present invention and, together with the description, further serve to explain the principles of the invention and to enable a person skilled in the pertinent art to make and use the invention.

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

To more clearly delineate the present invention, an effort is made throughout the specification to adhere to the following term definitions as consistently as possible.

The term "optical channel," "channel," and equivalents thereof, refer to any type of optical link for transporting an optical signal between two points.

The present invention provides a self-healing optical network where network restoration occurs entirely in the optical domain, thereby significantly reducing the amount of time it takes to re-route traffic. The self-healing optical network includes linear terminals optically coupled to optical switching units, where the optical switching units are connected in a ring configuration.

The present invention is described in an example environment consisting of four network nodes. Description of the invention in this environment is provided for convenience only and is not intended to be limiting. After reading the following detailed description, it will become apparent to a person skilled in the relevant art how to implement the invention in alternative environments that consist of a ring configuration having an arbitrary number of network nodes.

Figure 2:
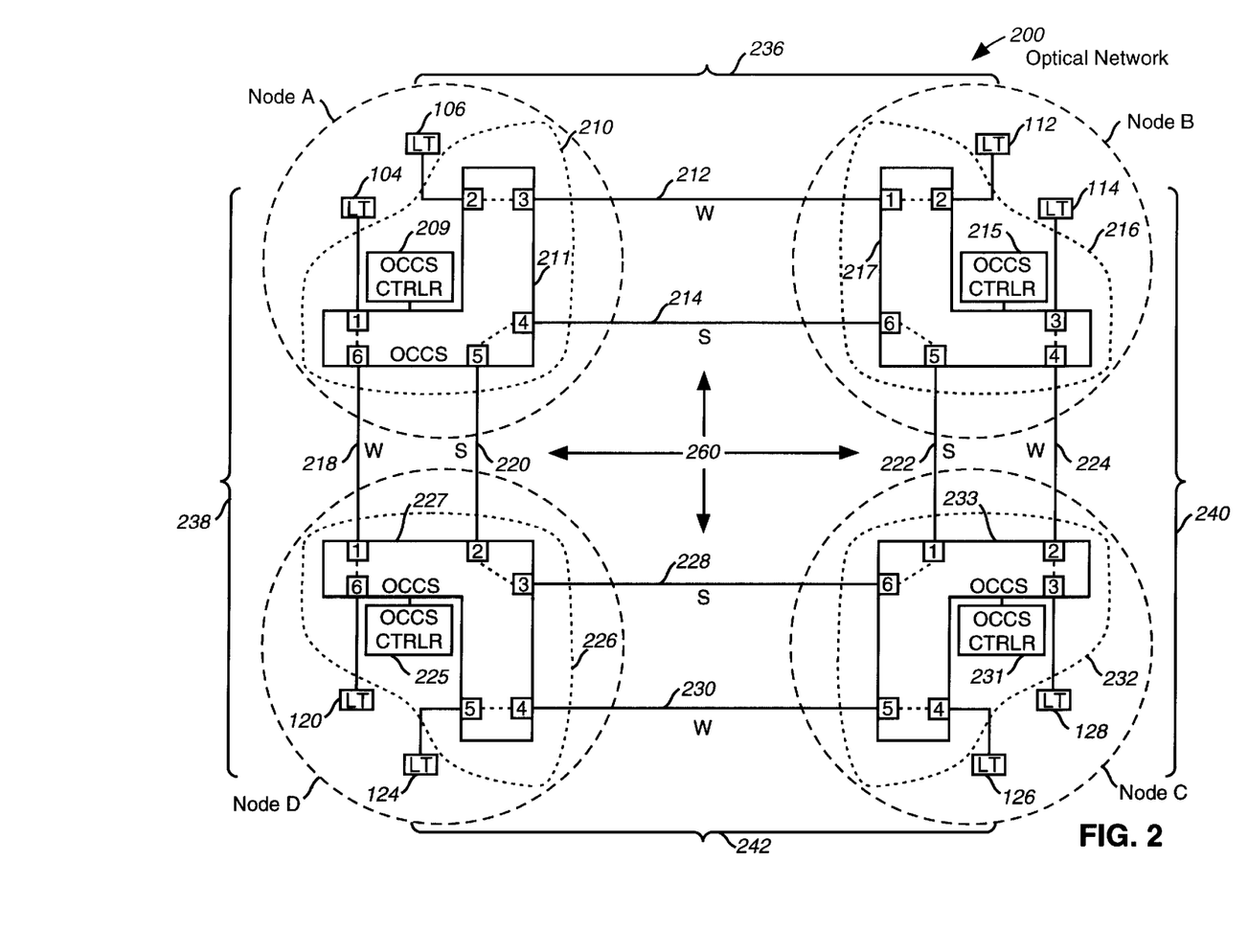
FIG. 2 illustrates a first embodiment of a self-healing optical network operating in normal mode.

FIG. 2 illustrates a self-healing optical network 200 according to a first embodiment of the present invention. The optical network shown in FIG. 2 has four nodes (A, B, C, D). Each node includes two linear terminals. Specifically, node A includes linear terminals 104 and 106. Node B includes linear terminals 112 and 114. Node C includes linear terminals 126 and 128. Node D includes linear terminals 120 and 124.

Provided at each node is an optical switching unit (OSU). Specifically, node A includes OSU 210, node B includes OSU 216, node C includes OSU 232, and node D includes OSU 226. Each OSU includes an optical cross-connect switch (OCCS) coupled to an OCCS controller. In one embodiment, an OCCS and an OCCS controller form one integral unit. In another embodiment, an OCCS and an OCCS controller exist as two separate units.

An OCCS is a device that can switch optical paths between a plurality of optical ports. In one example, any one of the plurality of optical ports can be internally optically coupled to one or more other ports within the OCCS.

OCCS controllers 209, 215, 231, and 225 direct the switching of OCCS 211, 217, 233, and 227, respectively. For example, OCCS controller 209, 215, 231, and 225 send and receive status and switch commands to and from OCCS 211, 217, 233, and 227, respectively. Examples of status and switch commands include coupling and decoupling commands. A port coupling command causes an OCCS to internally optically couple a first port of the OCCS to a second port of the OCCS. A port decoupling command causes an OCCS to internally optically decouple a first port of the OCCS from a second port of the OCCS.

Figure 3:
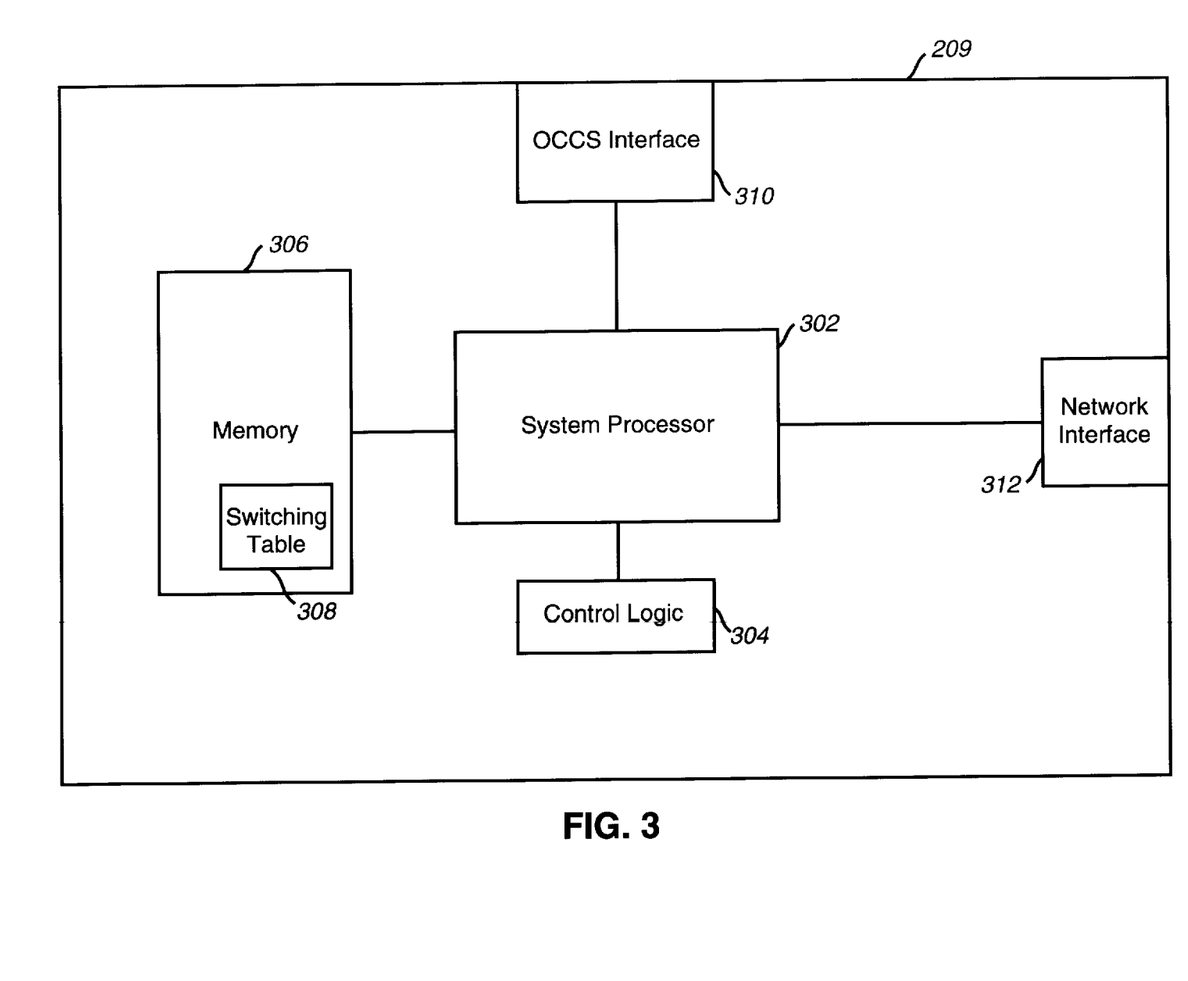
FIG. 3 illustrates an optical cross-connect switch controller.

FIG. 3 is a diagram illustrating a more detailed view of OCCS controller 209. OCCS controllers 215, 231, and 225 have the same configuration as OCCS controller 209 and are therefore not shown. OCCS controller 209 includes a system processor 302, control logic 304 to be executed by system processor 302, memory 306 for storing switching table 308, OCCS interface 310 for coupling OCCS controller 209 to OCCS 211, and data network interface 312 for coupling OCCS controller 209 to a communication channel.

As shown in FIG. 2, each OCCS 211, 217, 233, 227 is optically coupled to respective adjacent linear terminals. For example, ports 1 and 2 of OCCS 211 are optically coupled to linear terminals 104 and 106, respectively. Ports 2 and 3 of OCCS 217 are optically coupled to linear terminals 112 and 114, respectively. Ports 3 and 4 of OCCS 233 are optically coupled to linear terminals 126 and 128, respectively. Ports 5 and 6 of OCCS 227 are optically coupled to linear terminal 120 and 124, respectively.

OCCS 211, 217, 233, 227 are optically coupled in a ring configuration. There is a working optical channel (W) and spare optical channel (S) optically coupled between each OCCS. Specifically, working optical channel 212 is optically coupled between port 3 of OCCS 211 and port 1 of OCCS 217. Spare optical channel 214 is optically coupled between port 4 of OCCS 211 and port 6 of OCCS 217. Working optical channel 224 is optically coupled between port 4 of OCCS 217 and port 2 of OCCS 233. Spare optical channel 222 is optically coupled between port 5 of OCCS 217 and port 1 of OCCS 233. Working optical channel 230 is optically coupled between port 5 of OCCS 233 and port 4 of OCCS 227. Spare optical channel 228 is optically coupled between port 6 of OCCS 233 and port 3 of OCCS 227. Working optical channel 218 is optically coupled between port 1 of OCCS 227 and port 6 of OCCS 211. Lastly, spare optical channel 220 is optically coupled between port 2 of OCCS 227 and port 5 of OCCS 211.

Figure 7:
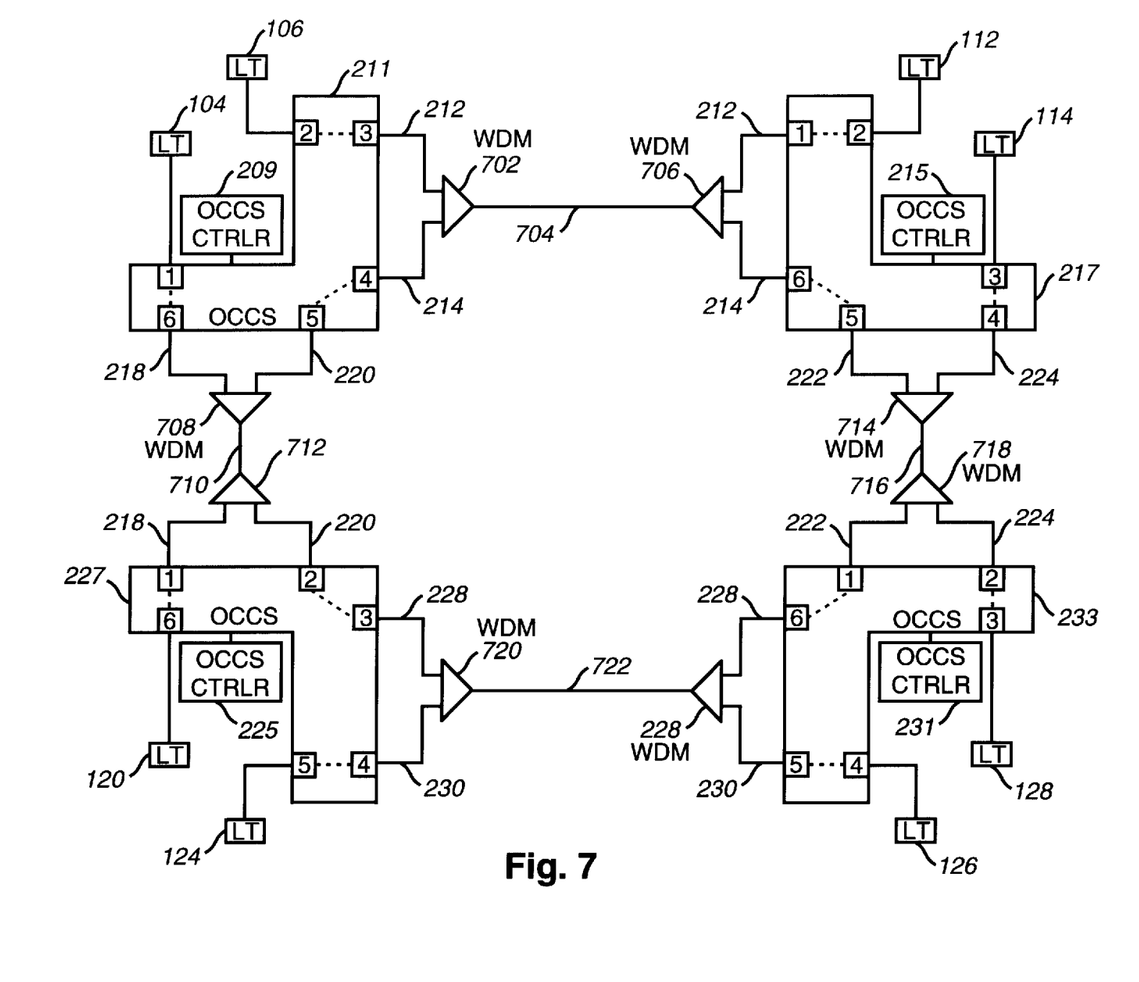
FIG. 7 illustrates a second embodiment of the self-healing optical network.

It should be noted that the working optical channel 212 and spare optical channel 214 can be carried by separate fiber optic cables as shown in FIG. 2, or they can be multiplexed onto a single fiber by wave length division multiplexers (WDMs), as shown in FIG. 7. Each pair of working/spare optical channels 218/220, 222/224, and 228/230 can also be carried in separate fiber optic cables or be multiplexed in different wavelengths onto a single fiber.

OCCS 211, 217, 233, and 227 are switched to form spare ring path 260 using spare optical channels 214, 222, 228 and 220. In other words, spare ring path 260 is formed by OCCS 211 internally optically coupling port 4 with port 5; OCCS 217 internally optically coupling port 6 with port 5; OCCS 233 internally optically coupling port I to port 6; and OCCS 227 internally optically coupling port 3 to port 2.

OCCS 211, 217, 233, and 227 are also switched to form four point-to-point working paths 236, 240, 242 and 238 using the four working optical channels 212, 224, 230 and 218. Point-to-point working path 236 is formed by optically coupling linear terminal 106 with linear terminal 112. Specifically, OCCS 211 internally optically couples port 2 with port 3 and OCCS 217 internally optically couples port 1 with port 2, thereby optically coupling linear terminal 106 with linear terminal 112 through working optical channel 212.

In a similar manner, working path 238 is formed by optically coupling linear terminal 104 with linear terminal 120, working path 240 is formed by optically coupling linear terminal 114 with linear terminal 128, and working path 242 is formed by optically coupling linear terminal 124 with linear terminal 126.

Figure 5:
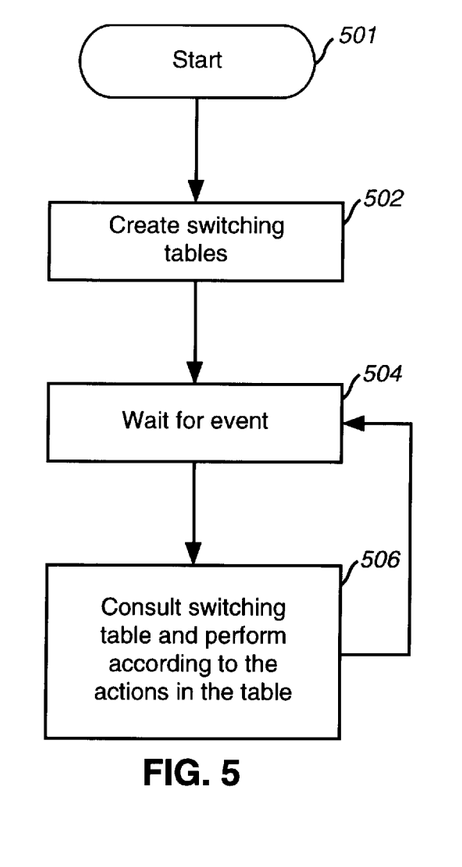
FIG. 5 illustrates a procedure for healing an optical network.

When one of the point-to-point working paths 236, 240, 242 or 238 fails (e.g., there is a break in one of the working optical channels) the linear terminals that were optically coupled by the working path will become optically decoupled. When this occurs, the present invention establishes an alternate path using a portion of spare ring 260 to optically couple the linear terminals affected by the failure. FIG. 5 illustrates a procedure for creating an alternate path using the spare ring 260 when any one of the working paths 236, 240, 242, 238 experiences a failure.

Figure 4A:
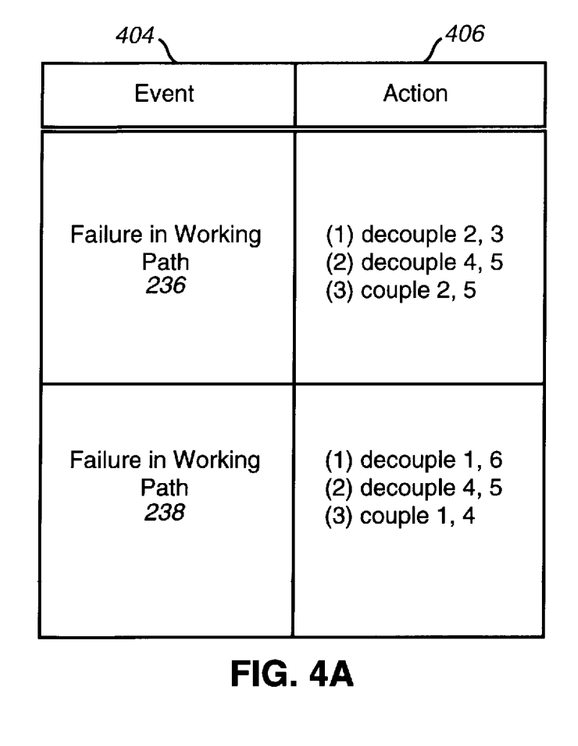
FIGS. 4A and 4B illustrate switching tables used by the OCCS controllers.
Figure 4B:
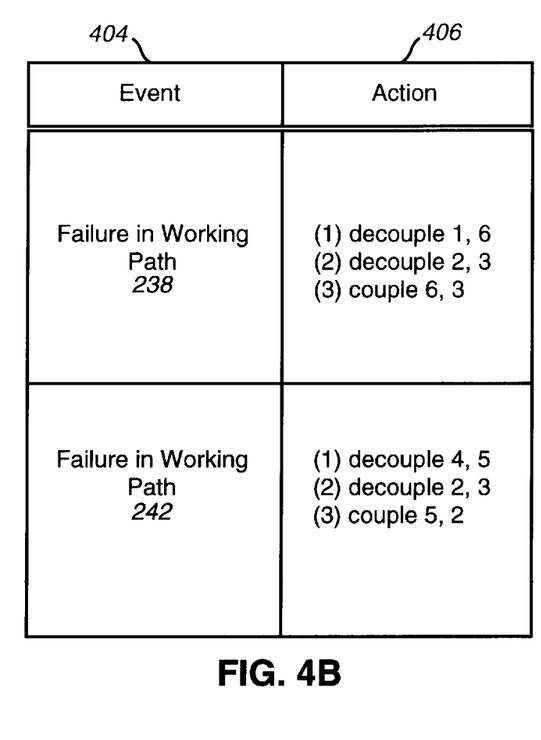

The procedure begins at step 501 where control immediately passes to step 502. In step 502, a switching table for OCCS controllers 211, 217, 227, and 233 is created. By way of example, the switching table for OCCS controllers 211 and 227 are shown in FIGS. 4A and 4B, respectively. A switching table is a table having at least two columns, an event column 404 and an action column 406. In this example, for every event that is detected by an OCCS controller, there is a corresponding course of action that the OCCS controller will take.

As shown in FIG. 4A, OCCS controller 211 detects at least two events: (1) a failure in working path 236; and (2) a failure in working path 238. Similarly, OCCS controller 227 detects two events: (1) a failure in working path 238; and (2) a failure in working path 242.

OCCS controller 209 detects a failure in working path 236 by receiving a failure indication from linear terminal 106 or other fast, reliable fault detection system such as is described in copending U.S. application No. 08/582,845, entitled "Method and System for Detecting Optical Faults in a Network Fiber Link," filed by John A. Fee on Dec. 29, 1995, assigned to the assignee of the present invention and incorporated by reference herein. Another fast, reliable fault detection method and system is described in copending U.S. application No. 08/580,391 entitled, "Method and System for Detecting Optical Faults Within the Optical Domain of a Fiber Communication Network," filed by Shoa-Kai Liu on Dec. 28, 1995, assigned to the assignee of the present invention and incorporated by reference herein. For ease of understanding the invention, the invention will be described in the environment where the failure indications are generated by the linear terminals, but by no means is the invention limited to such an environment.

OCCS controller 209 detects a failure in working path 238 by receiving a failure indication from linear terminal 104. Similarly, OCCS controller 225 detects a failure in working path 238 by receiving a failure indication from linear terminal 120, and it detects a failure indication in working path 242 by receiving a failure indication from linear terminal 124.

In step 504, each OCCS controller 209, 215, 231 and 225 waits for an event to occur. When an event is detected by an OCCS controller, control passes to step 506.

In step 506, the OCCS controller that detected the event consults its switching table to determine the action that the switching table directs it to take. The result of these actions is the creation of an alternate point-to-point path that circumvents a failure in a working path.

Figure 6:
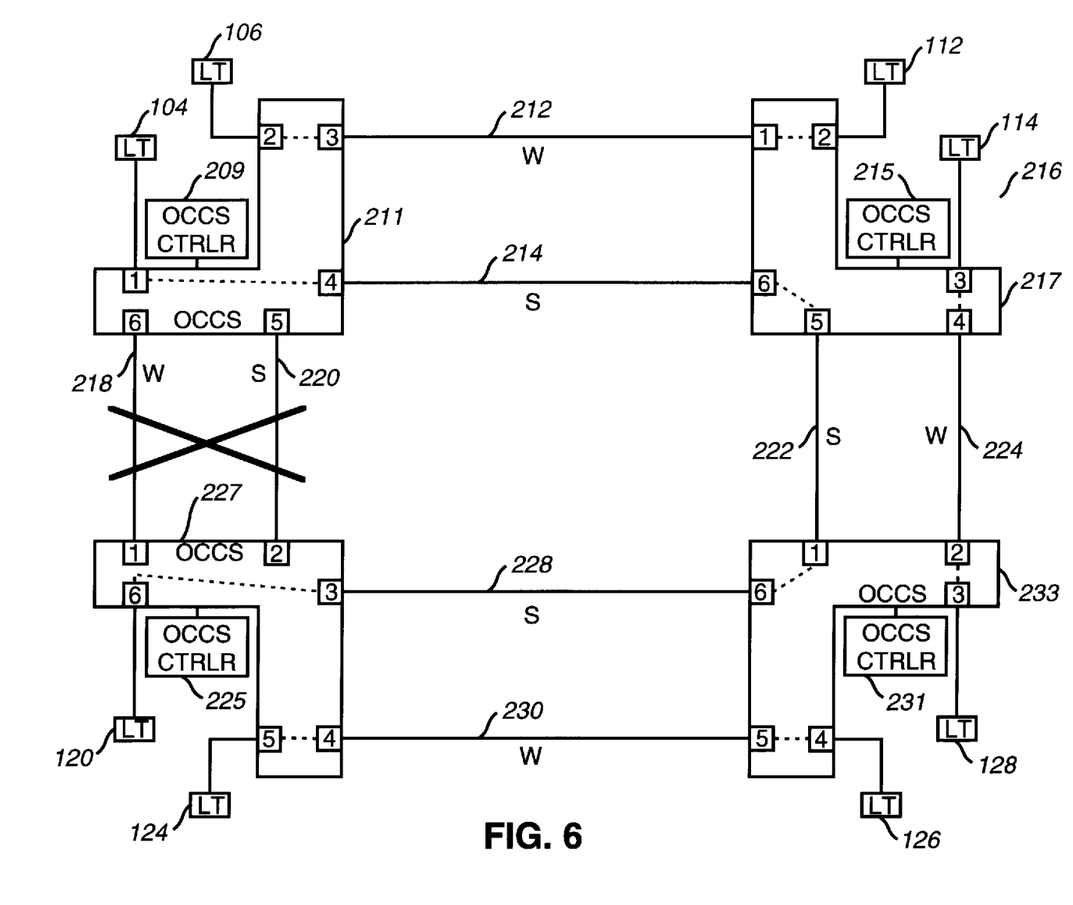
FIG. 6 illustrates the first embodiment of the self-healing optical network operating in a failure mode.

For example, assuming that working path 238 experiences a failure, then OCCS controller 209 receives a failure indication from linear terminal 104 and OCCS controller 225 receives a failure indication from linear terminal 120. Upon receiving the failure indications, both OCCS controller 209 and 225 respond according to their switching tables (see FIGS. 4A and 4B, respectively). According to the switching table for OCCS controller 209, OCCS controller 209 directs OCCS 211 to internally decouple port 4 from port 5, internally decouple port 1 from port 6, and internally couple port 1 to port 4. According to the switching table for OCCS controller 225, OCCS controller 225 directs OCCS 227 to internally decouple port 2 from port 3, internally decouple port 1 from port 6, and internally couple port 6 to port 3. FIG. 6 illustrates the reconfiguration of optical network 200 after a failure in working optical channel 218 is detected.

After OCCS controllers 209 and 225 respond to a failure in working optical channel 238, an alternate path optically coupling linear terminal 104 to linear terminal 120 is created using a portion of spare ring path 260. Specifically, linear terminal 104 is optically coupled to linear terminal 120 through spare optical channels 214, 222, and 228.

The amount of time it takes to create an alternate path through optical switching, according to the present invention, is significantly faster than conventional methods for re-routing traffic that rely on electrical digital cross-connect switches because restoration is done at the optical layer and predetermined switch state tables are used.

FIG. 7 illustrates a second embodiment of the present invention. As shown in FIG. 7, WDMs 702, 706 are placed between OCCS 211 and OCCS 217 to multiplex working optical channel 212 and spare optical channel 214 onto optical fiber 704. Similarly, WDMs 708, 712 are placed between OCCS 211 and OCCS 227 to multiplex working optical channel 218 and spare optical channel 220 onto optical fiber 710. WDMs 714, 718 are placed between OCCS 217 and OCCS 233 to multiplex working optical channel 224 and spare optical channel 222 onto optical fiber 716. WDMs 720, 724 are placed between OCCS 227 and OCCS 233 to multiplex working optical channel 230 and spare optical channel 228 onto optical fiber 722. This second embodiment of the present invention functions to provide a ring configuration of OSUs which can be optically switched to provide a spare path through spare optical channels around the ring configuration. The OSUs can also be switched to provide working paths between linear terminals. Thus, the process shown in FIG. 5, as described above, also applies to this WDM embodiment of the present invention as would be apparent to a person skilled in the relevant art.

Figure 8:
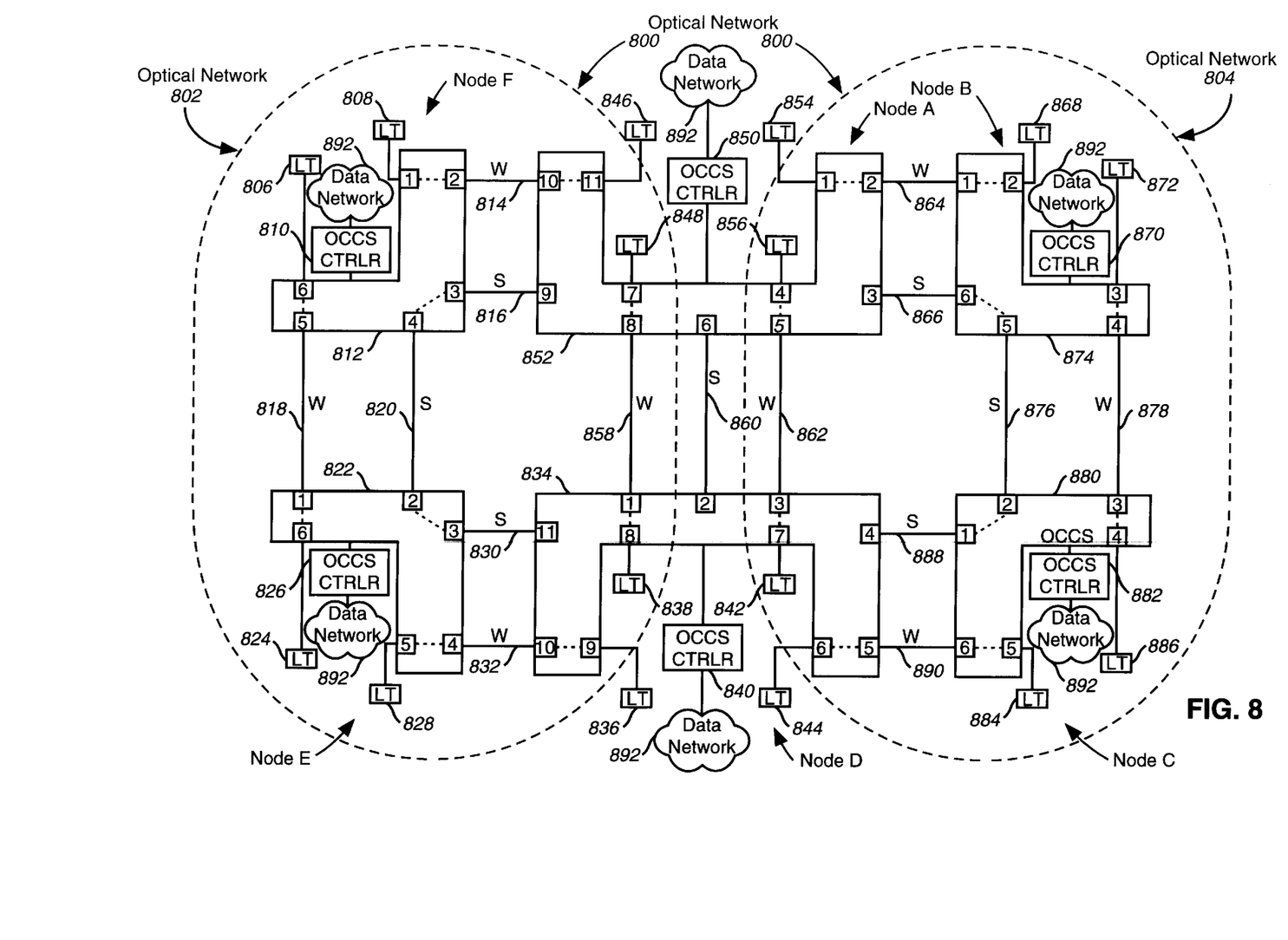
FIG. 8 illustrates a third embodiment of the self-healing optical network.

FIG. 8 illustrates another embodiment of the present invention. FIG. 8 is a diagram of an optical self-healing network 800 having two self-healing optical networks 802 and 804, wherein networks 802 and 804 share spare optical channel 860. By having two optical networks share a spare optical channel, a cost savings is realized.

Spare optical channel 860 can be optically coupled into network 802 or network 804 by OCCS 852 and 834. For example, network 802 can use spare optical channel 860 if there is a break in the network between nodes A and F, nodes E and F, or nodes D and E. Similarly, network 804 can use spare optical channel 860 if there is a break in the network between nodes A and B, nodes B and C, or nodes C and D.

The individual optical networks 802 and 804 self-heal using the same basic procedure illustrated in FIG. 6. In other words, the OCCS controllers detect network failures and then direct their corresponding optical cross-connect switches to make the necessary optical couplings to circumvent the failures according to a pre-defined switching table that exists for each OCCS controller.

OCCS controllers 850 and 840 detect seven network failures. These failures include: (1) failure between nodes A and B; (2) failure between nodes B and C; (3) failure between nodes C and D; (4) failure between nodes D and E; (5) failure between nodes E and F; (6) failure between nodes F and A; and (7) failure between nodes A and D.

OCCS controller 850 is able to detect a failure between nodes A and B because linear terminal 854 or an other fast, reliable fault detection device sends a failure notifications to OCCS controller 850. OCCS controller 840 detects a failure between nodes A and B because OCCS controller 850 sends a message through data network 892 to OCCS controller 840 indicating that a failure occurred between nodes A and B when such a failure is detected by OCCS controller 850.

OCCS controllers 850 and 840 are able to detect a failure between nodes B and C by having OCCS controllers 870 and/or 882 transmit a message indicating a failure between nodes B and C through data network 892 to both OCCS controller 850 and 840. OCCS controller 870 and 882 are aware of failures between nodes B and C because they receive failure indications from linear terminals 872 and 886, respectively.

OCCS controller 840 is able to detect a failure between nodes C and D because linear terminal 844 sends failure notifications to OCCS controller 840. OCCS controller 850 detects a failure between nodes C and D because when such a failure is detected by OCCS controller 840, OCCS controller 840 sends a message through data network 892 to OCCS controller 850 indicating the failure.

In a similar manner, OCCS controllers 850 and 840 detect failures between nodes D and E, nodes E and F, and nodes F and A.

In order to illustrate the operation of optical network 800, two failure scenarios will be discussed: (1) a failure between nodes A and B; and (2) a failure between nodes B and C.

When a failure occurs between nodes A and B linear terminal 854 is optically decoupled from linear terminal 868. As described above, OCCS controllers 850, 870, and 840 detect the failure. Upon detecting the failure, OCCS controller 850, 870, and 840 each consult their respective internal switching tables and direct OCCS 852, 874, and 834 to switch accordingly.

Specifically, OCCS controller 850 directs OCCS 852 to internally optically couple port 1 with port 6, thereby optically coupling linear terminal 854 to spare optical channel 860. OCCS controller 840 directs OCCS 834 to internally optically couple port 2 to port 4, thereby optically coupling spare optical channel 860 to spare optical channel 888. Lastly, OCCS controller 870 directs OCCS 874 to internally optically couple port 2 to port 5, thereby optically coupling linear terminal 868 to spare optical channel 876.

Figure 9:
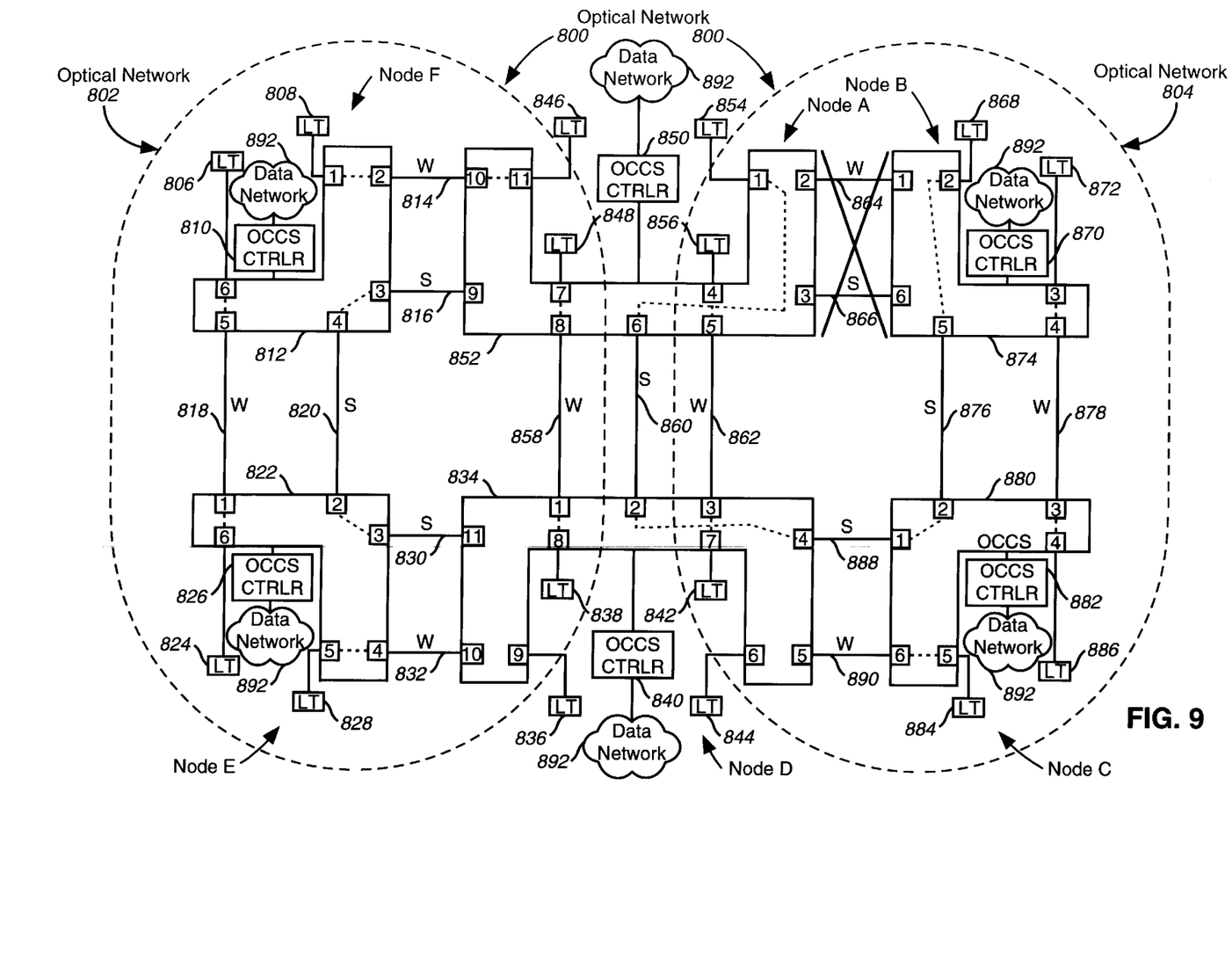
FIG. 9 illustrates the configuration of optical network 800 when a failure occurs between nodes A and B.

After OCCS 852, 874, and 834 perform the port coupling operations, linear terminal 854 is optically coupled to linear terminal 868 using spare optical channels 860, 888, and 876. In this manner, the failure between nodes A and B is circumvented. This can be seen in FIG. 9, which illustrates the reconfiguration of optical network 800 upon a failure between nodes A and B.

When a failure occurs between nodes B and C linear terminal 872 is optically decoupled from linear terminal 886. As described above, OCCS controllers 850, 870, 882, and 840 detect the failure. Upon detecting the failure, OCCS controller 850, 870, 882, and 840 consult their respective internal switching tables and direct OCCS 852, 874, 880, and 834 to switch accordingly.

Specifically, OCCS controller 870 directs OCCS 874 to internally optically couple port 3 to port 6, thereby optically coupling linear terminal 872 to spare optical channel 866. OCCS controller 882 directs OCCS 880 to internally optically couple port 4 to port 1, thereby optically coupling linear terminal 886 to spare optical channel 888. OCCS controller 840 directs OCCS 834 to internally optically couple port 4 to port 2, thereby optically coupling spare optical channel 860 to spare optical channel 888. Lastly, OCCS controller 850 directs OCCS 852 to internally optically couple port 3 to port 6, thereby optically coupling spare optical channel 860 to spare optical channel 866.

Figure 10:
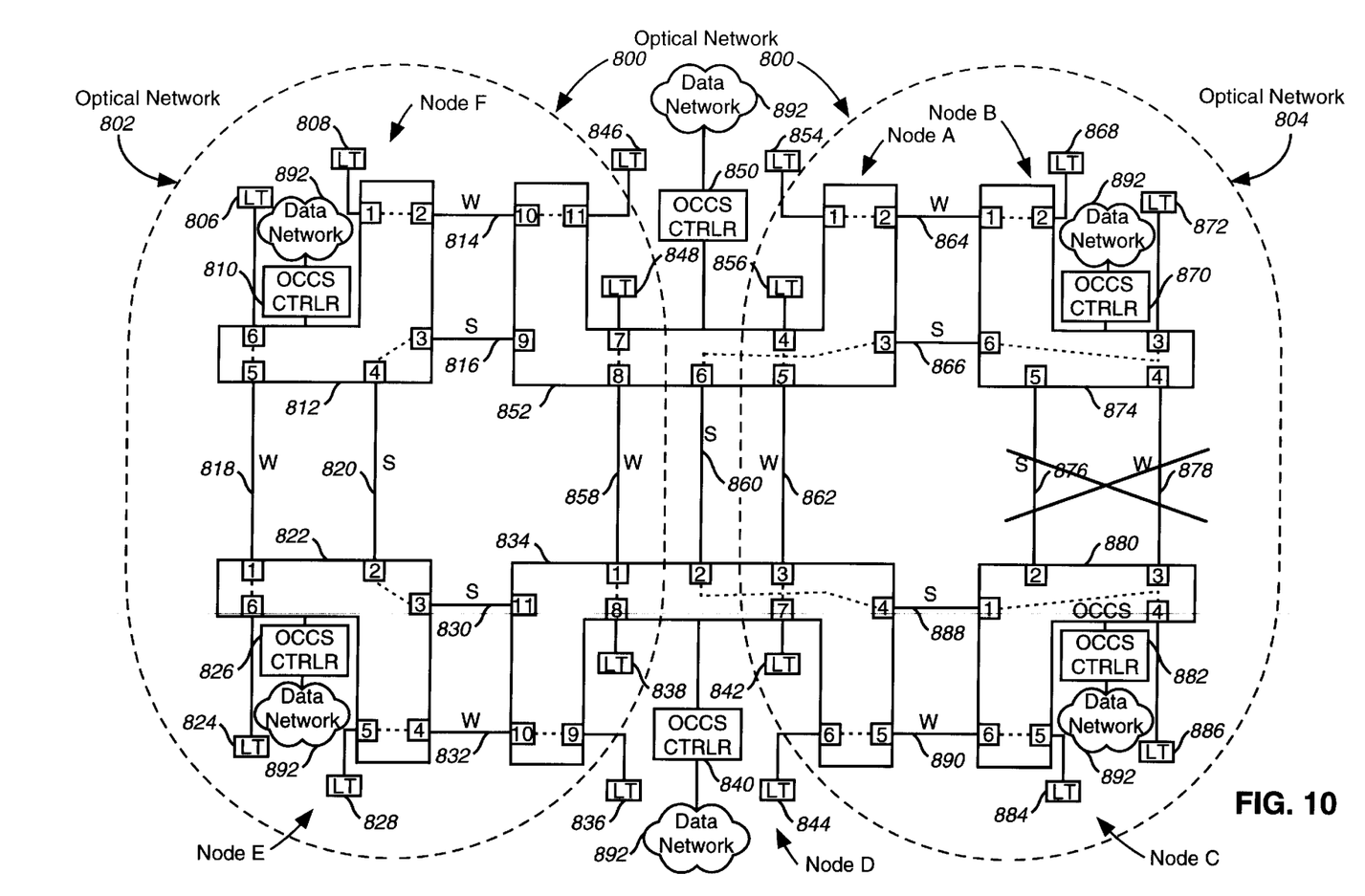
FIG. 10 illustrates the configuration of optical network 800 when a failure occurs between nodes B and C.

After OCCS 852, 874, 880, and 834 perform the port coupling operations, linear terminal 872 is optically coupled to linear terminal 886 using spare optical channels 888, 860, and 866. In this manner, the failure between nodes B and C is circumvented. This can be seen in FIG. 10, which illustrates the reconfiguration of optical network 800 upon a failure between nodes B and C.

In a similar manner, failures between nodes C and D, nodes D and E, nodes E and F, nodes F and A, and nodes A and D are circumvented.

While various embodiments of the present invention have been described above, it should be understood that they have been presented by way of example, and not limitation. It will be understood by those skilled in the relevant art that various changes in form and detail may be made therein without departing from the spirit and scope of the invention as defined by the following claims. Thus the breadth and scope of the present invention should not be limited by any of the above-described exemplary embodiments, but should be defined only in accordance with the following claims and their equivalents.

What is claimed is:

1. A self-healing optical network carrying traffic between first and second optical linear terminals, comprising:

a plurality of optical switching units, including first, second, and third optical switching units;

a plurality of spare optical channels; and a working optical channel;

said plurality of optical switching units being optically coupled in a ring configuration using said plurality of spare optical channels, such that a spare optical channel is provided between each pair of adjacent optical switching units in said ring configuration, the first optical linear terminal being optically coupled to the second optical linear terminal through a first pair of adjacent optical switching units and said working optical channel or, in the event said working optical channel is not available, through said plurality of optical switching units and said plurality of spare optical channels except said spare optical channel provided between said first pair of adjacent optical switching units, and said first pair of adjacent optical switching units comprises said first and second optical switching units, said first optical switching unit comprising a first optical cross-connect switch responsive to a first optical cross-connect switch controller, and said second optical switching unit comprising a second optical cross-connect switch responsive to a second optical cross-connect switch controller.

2. The self-healing optical network of claim 1, wherein the first optical linear terminal is optically coupled to said first optical cross-connect switch, and the second optical linear terminal is optically coupled to said second optical cross-connect switch.

3. The self-healing optical network of claim 2, wherein said first optical cross-connect switch controller receives a first failure indication when a failure occurs in said working optical channel.

4. The self-healing optical network of claim 3, wherein the first optical linear terminal transmits said first failure indication to said first optical cross-connect switch controller.

5. The self-healing optical network of claim 4, wherein said first optical cross-connect switch controller includes a first switching table, and said second optical cross-connect switch controller includes a second switching table, said first and second switching tables each having an event column and an action column.

6. The self-healing optical network of claim 5, wherein, upon receiving said first failure indication, said first optical cross-connect switch controller consults said first switching table and sends a command corresponding to an action in said first switching table to said first optical cross-connect switch.

7. The self-healing optical network of claim 3, wherein said second optical cross-connect switch controller receives a second failure indication when said failure occurs in said working optical channel.

8. The self-healing optical network of claim 7, wherein the second optical linear terminal transmits said second failure indication to said second optical cross-connect switch controller.

9. A self-healing optical network carrying traffic between first and second optical linear terminals, comprising:

a plurality of optical switching units, including first, second, and third optical switching units;

a plurality of spare optical channels; and a working optical channel;

said plurality of optical switching units being optically coupled in a ring configuration using said plurality of spare optical channels, such that a spare optical channel is provided between each pair of adjacent optical switching units in said ring configuration, and the first optical linear terminal being optically coupled to the second optical linear terminal through a first pair of adjacent optical switching units and said working optical channel or, in the event said working optical channel is not available, through said plurality of optical switching units and said plurality of spare optical channels except said spare optical channel provided between said first pair of adjacent optical switching units wherein the first optical linear terminal is optically coupled to a first port of said first optical switching unit, and the second optical linear terminal is optically coupled to a first port of said second optical switching unit, said working optical channel optically coupling a second port of said first optical switching unit with a second port of said second optical switching unit, and said first optical switching unit optically coupling said first port of said first optical switching unit to said second port of said first optical switching unit, and said second optical switching unit optically coupling said first port of said second optical switching unit to said second port of said second optical switching unit, thereby optically coupling the first linear terminal to the second linear terminal through said working optical channel, said first optical switching unit, and said second optical switching unit.

10. The self-healing optical network of claim 9, wherein said spare optical channel provided between said first and second optical switching units optically couples a third port of said first optical switching unit with a third port of said second optical switching unit, a first spare optical channel of said plurality of spare optical channels being optically coupled to a fourth port of said first optical switching unit, and a second spare optical channel of said plurality of spare optical channels being optically coupled to a fourth port of said second optical switching unit, wherein said first optical switching unit optically couples said third port of said first optical switching unit to said fourth port of said first optical switching unit, and said second optical switching unit optically couples said third port of said second optical switching unit to said fourth port of said second optical switching unit.

11. The self-healing optical network of claim 10, wherein, when said working optical channel experiences a failure, said first optical switching unit optically decouples said third port of said first optical switching unit from said fourth port of said first optical switching unit, and optically couples said first port of said first optical switching unit to said fourth port of said first optical switching unit, thereby routing traffic around said failure.

12. A self-healing optical network carrying traffic between first and second optical linear terminals, comprising:

a plurality of optical switching units, including first, second, and third optical switching units;

a plurality of spare optical channels; and a working optical channel;

said plurality of optical switching units being optically coupled in a ring configuration using said plurality of spare optical channels, such that a spare optical channel is provided between each pair of adjacent optical switching units in said ring configuration, and the first optical linear terminal being optically coupled to the second optical linear terminal through a first pair of adjacent optical switching units and said working optical channel or, in the event said working optical channel is not available, through said plurality of optical switching units and said plurality of spare optical channels except said spare optical channel provided between said first pair of adjacent optical switching units wherein the first linear terminal is an optoelectronic line terminal element.

13. A self-healing optical network carrying traffic between first and second optical linear terminals, comprising:

a plurality of optical switching units, including first, second, and third optical switching units;

a plurality of spare optical channels; and a working optical channel;

said plurality of optical switching units being optically coupled in a ring configuration using said plurality of spare optical channels, such that a spare optical channel is provided between each pair of adjacent optical switching units in said ring configuration, and the first optical linear terminal being optically coupled to the second optical linear terminal through a first pair of adjacent optical switching units and said working optical channel or, in the event said working optical channel is not available, through said plurality of optical switching units and said plurality of spare optical channels except said spare optical channel provided between said first pair of adjacent optical switching units further comprising a first wave length division multiplexer (WDM) and a second WDM, wherein said first and second WDMs multiplex said working optical channel and said spare optical channel provided between said first pair of adjacent optical switching units onto an optical fiber.

14. A self-healing optical network, comprising:

a first optical network;

a second optical network;

a first optical switching unit optically coupled to said first and second optical networks;

a second optical switching unit optically coupled to said first and second optical networks; and a spare optical channel optically coupled between a first port of said first optical switching unit and a first port of said second optical switching unit, wherein said first optical switching unit optically couples said first optical network to said spare optical channel when said first optical network experiences a failure, said first optical switching unit optically couples said second optical network to said spare optical channel when said second optical network experiences a failure, said second optical switching unit optically couples said first optical network to said spare optical channel when said first optical network experiences a failure, and said second optical switching unit optically couples said second optical network to said spare optical channel when said second optical network experiences a failure.

15. The self-healing optical network of claim 14, wherein said first optical network comprises first and second linear terminals, and said second optical network comprises third and fourth linear terminals, wherein said first linear terminal is optically coupled to a second port of said first optical switching unit, said third linear terminal is optically coupled to a third port of said first optical switching unit, said second linear terminal is optically coupled to a second port of said second optical switching unit, and said fourth linear terminal is optically coupled to a third port of said second optical switching unit.

16. The self-healing optical network of claim 15, wherein said first optical network further includes a first working optical channel optically coupled to a fourth port of said first optical switching unit, and said first optical switching unit optically couples its said second port with its said fourth port, thereby optically coupling said first linear terminal with said first working optical channel.

17. The self-healing optical network of claim 16, wherein said second optical network further includes a second working optical channel optically coupled to a fifth port of said first optical switching unit, and said first optical switching unit optically couples its said third port with its said fifth port, thereby optically coupling said third linear terminal with said second working optical channel.

18. The self-healing optical network of claim 16, wherein said first optical switching unit receives a failure indication when a failure is detected in said first working optical channel.

19. The self-healing optical network of claim 18, wherein said first linear terminal detects said failure and transmits said failure indication to said first optical switching unit.

20. The self-healing optical network of claim 18, wherein upon receiving said failure indication, said first optical switching unit optically couples its said first port to its said second port, thereby optically coupling said first linear terminal with said spare optical channel.

21. The self-healing optical network of claim 18, wherein upon receiving said failure indication, said first optical switching unit transmits a message indicating said failure in said working optical channel to said second optical switching unit though a data network.

22. In an optical network having a plurality of optical switching units, including first, second, and third optical switching units, the first optical switching unit comprising a first optical cross-connect switch responsive to a first optical cross-connect switch controller, and the second optical switching unit comprising a second optical cross-connect switch responsive to a second optical cross-connect switch controller, the method for self-healing the optical network, comprising the steps of:

optically coupling the optical switching units in a ring configuration using a plurality of spare optical channels, such that a spare optical channel is provided between each pair of adjacent optical switching units and said ring configuration;

optically coupling a first linear terminal to a second linear terminal through the first optical switching unit, the second optical switching unit, and a working optical channel, wherein the first and second optical switching units are adjacent in said ring configuration; and when a failure occurs in said working optical channel, switching the first and second optical switching units to optically couple said first linear terminal to said second linear terminal through the plurality of optical switching units and all of said spare optical channels except said spare optical channel between the the first and second optical switching units.

23. The method of claim 22, further comprising the step of transmitting a first failure indication to said first optical cross-connect switch controller upon detecting a failure in said working optical channel.

24. The method of claim 23, wherein the step of transmitting said first failure indication is performed by said first optical linear terminal.

25. The method of claim 23, further comprising the step of transmitting a second failure indication to said second optical cross-connect switch controller upon detecting said failure in said working optical channel.

26. The method of claim 25, wherein the step of transmitting said second failure indication is performed by said second optical linear terminal.

27. The method of claim 26, wherein said first optical cross-connect switch controller includes a first switching table, and said second optical cross-connect switch controller includes a second switching table, said first and second switching tables each having an event column and an action column.

28. The method of claim 27, further comprises the steps of consulting said first switching table and transmitting a command corresponding to an action in said first switching table to said first optical cross-connect switch upon receiving said first failure indication.

29. The method of claim 28, further comprises the steps of consulting said second switching table and transmitting a command corresponding to an action in said second switching table to said second optical cross-connect switch upon receiving said second failure indication.

30. A method for sharing a spare optical channel between first and second optical networks, wherein the spare optical channel is optically coupled between a first optical switching unit and a second optical switching unit, and wherein the first optical network includes a first linear terminal and a second linear terminal, and the second optical network includes a first linear terminal and second linear terminal, the method comprising the steps of:

receiving a failure indication at the first optical switching unit indicating a failure in one of the first optical network and the second optical network;

optically coupling the first linear terminal of the first optical network with the spare optical channel if said failure indication indicates a failure in the first optical network;

optically coupling the first linear terminal of the second optical network with the spare optical channel if said failure indication indicates a failure in the second optical network; and transmitting a message from the first optical switching unit to the second optical switching unit through a data network, wherein said message indicates a failure in the first optical network if said failure indication indicates a failure in the first optical network or said message indicates a failure in the second optical network if said failure indication indicates a failure in the second optical network.

31. A method for sharing a first spare optical channel between first and second optical networks, wherein the first spare optical channel is optically coupled between a first optical switching unit and a second optical switching unit, and wherein the first optical network includes a second spare optical channel and a third spare optical channel, and the second optical network includes a fourth spare optical channel and fifth spare optical channel, the method comprising the steps of:

detecting a failure in the first optical network or the second optical network;

optically coupling the second and third spare optical channels to the first spare optical channel when a failure in the first optical network is detected; and optically coupling the fourth and fifth spare optical channels to the first spare channel when a failure in the second optical network is detected.

32. An optical network apparatus comprising:

first and second optical switching units including at least two working optical channels and a spare first optical channel optically coupled therebetween;

a first optical network comprising a working optical channel and a spare second optical channel interconnected to said first and second optical switching units to form a first working optical channel ring;

a second optical network comprising a working optical channel and a spare third optical channel interconnected to said first and second optical switching units to form a second working optical channel ring;

means for detecting a failure in the first or the second working optical channel ring;

means for optically coupling the spare first optical channel to said spare second optical channel of said first optical network when a failure in the first optical network is detected; and means for optically coupling the spare first optical channel to said spare third optical channel of said second optical network when a failure in the second optical network is detected.

* * * * *